UNITED STATES PATENT OFFICE.

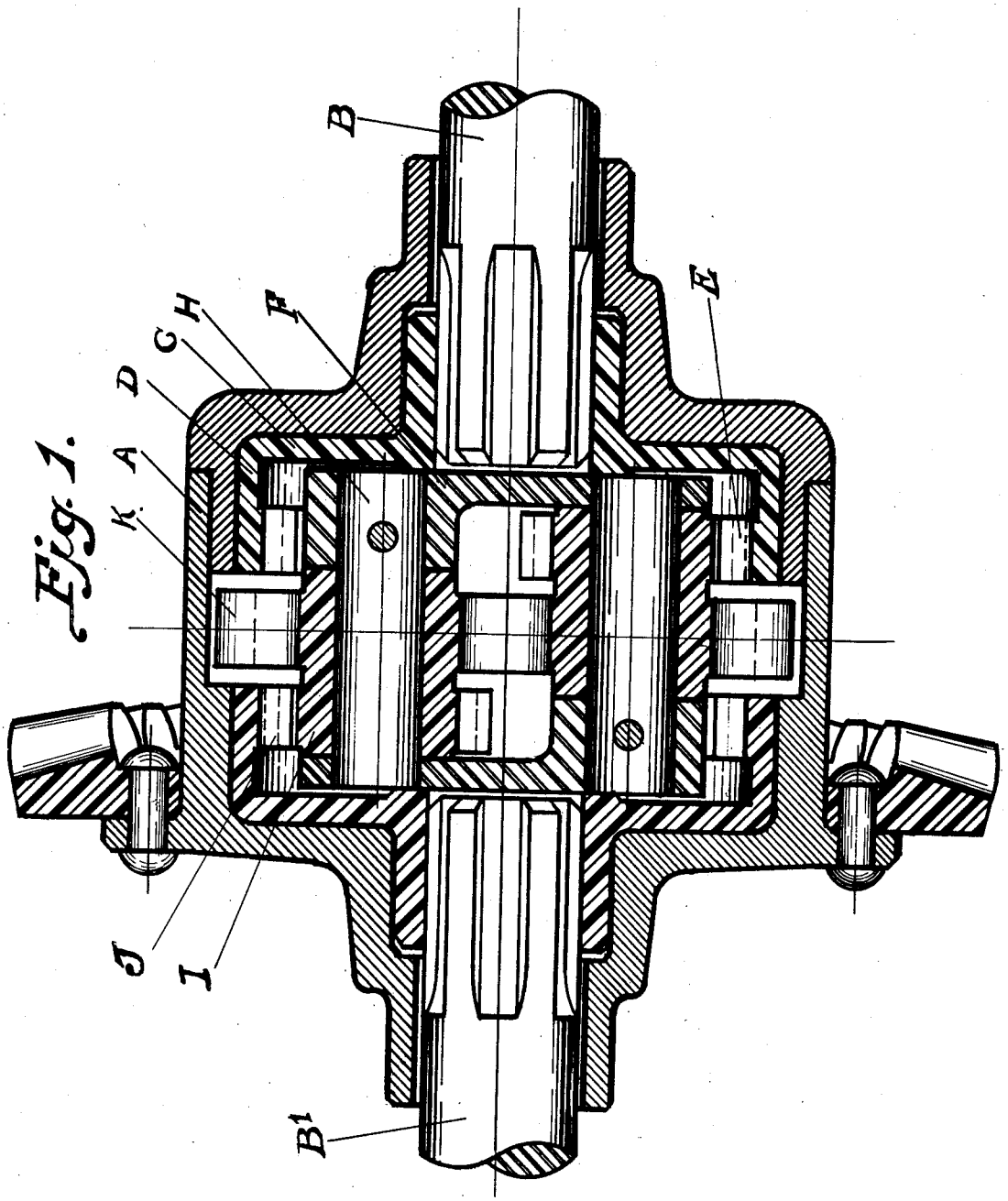

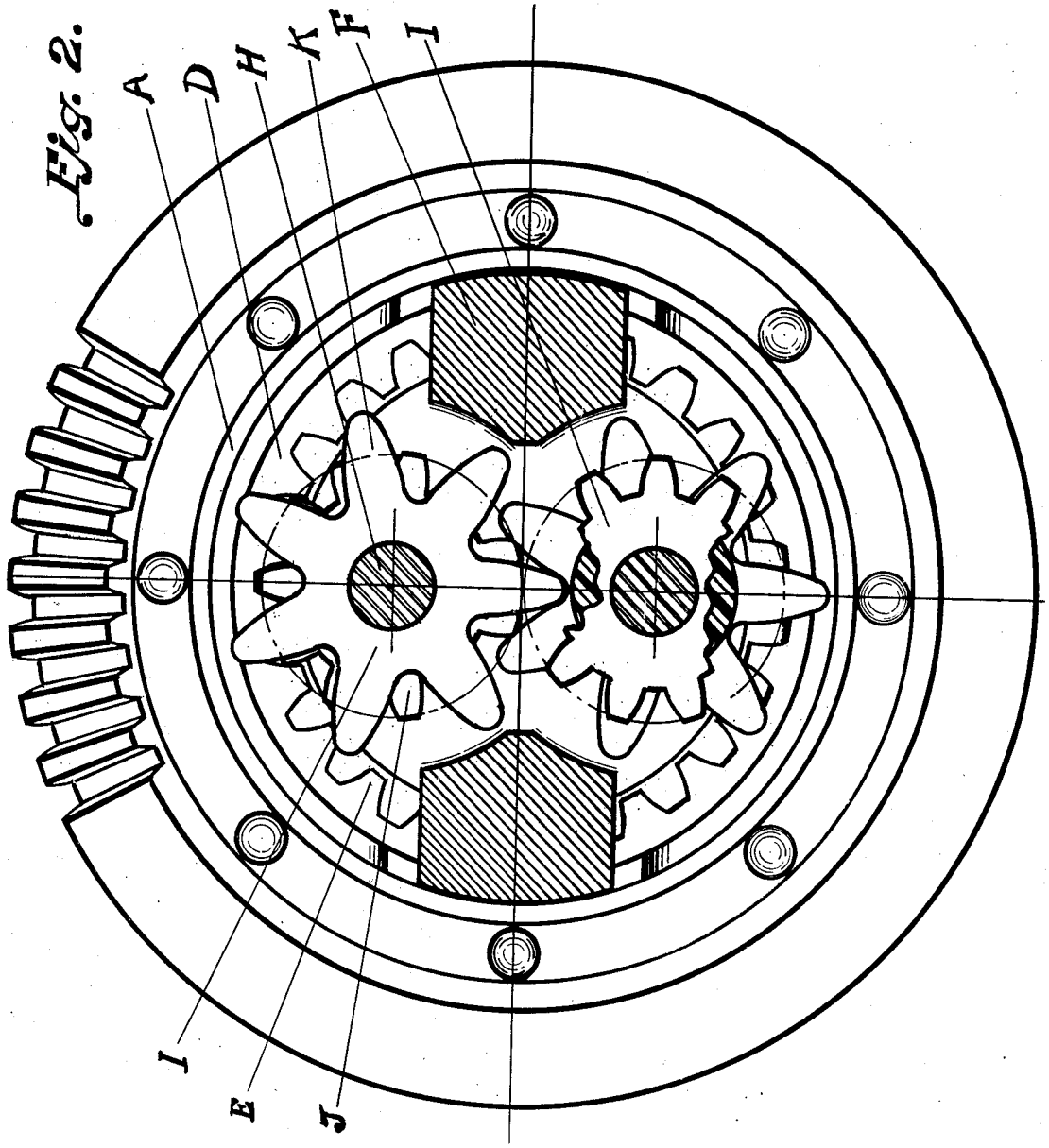

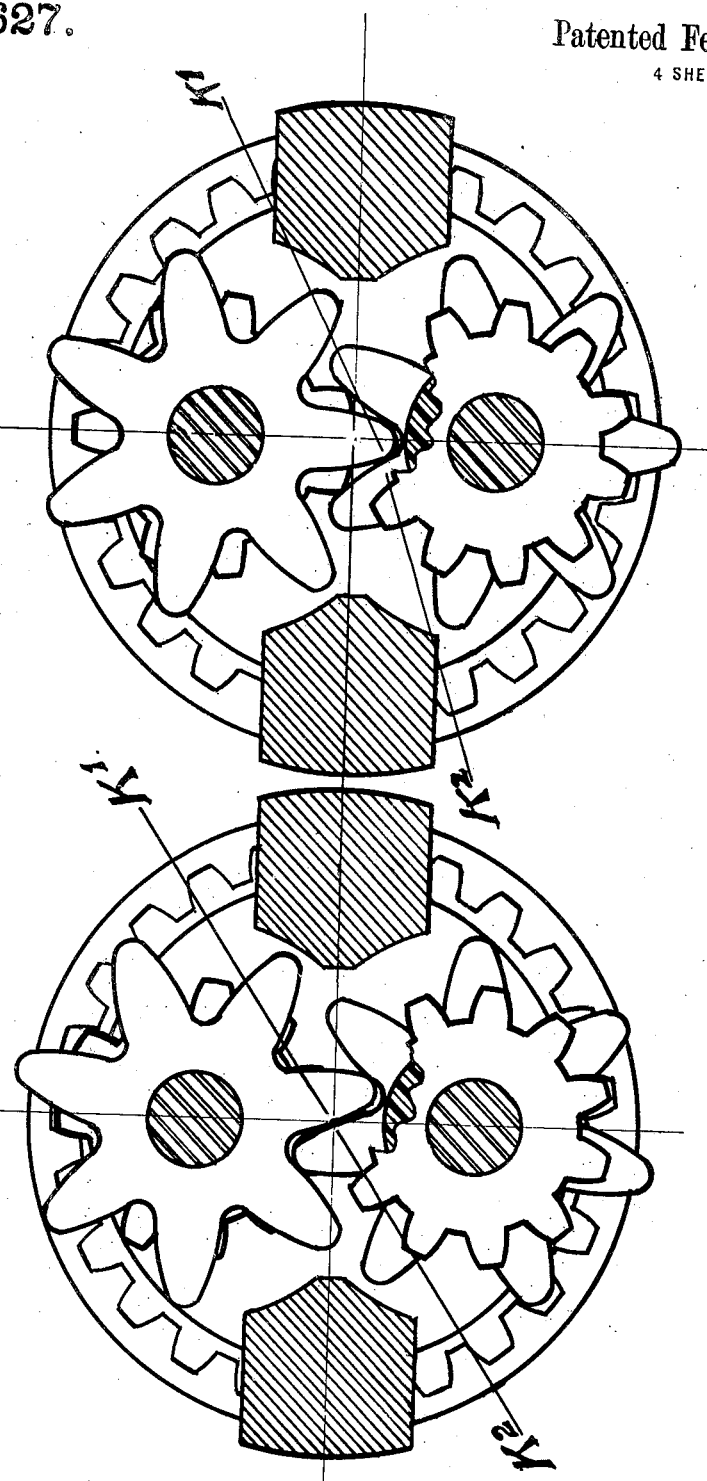

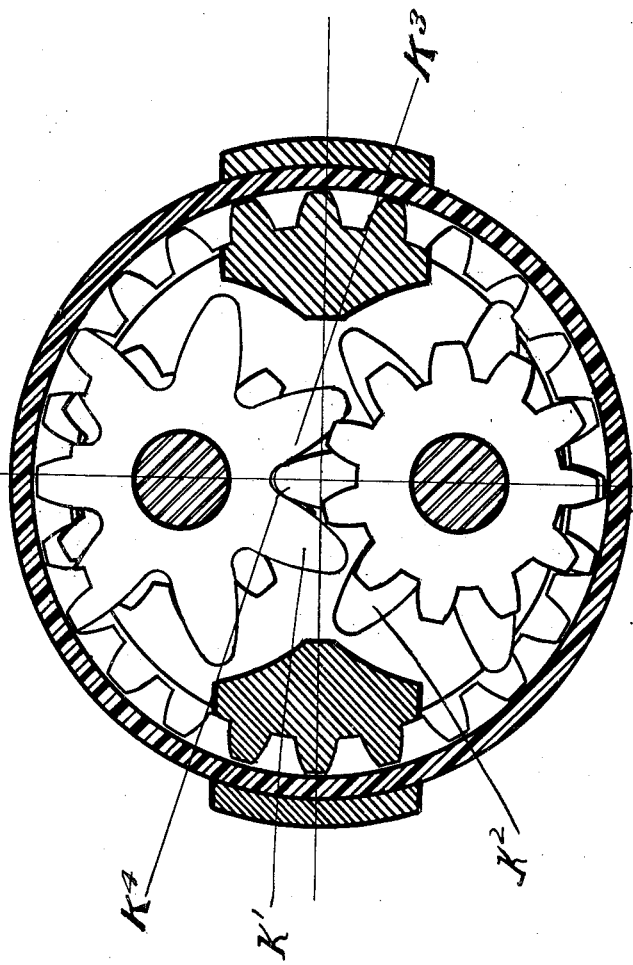

FRANK V. ELBERTZ, OF KOKOMO, INDIANA, ASSIGNOR OF ONE-FOURTH TO ANDREW BACHLE, OF DETROIT, MICHIGAN.

VARIABLE-LEVERAGE GEARING.

1,406,627.  Specification of Letters Patent.  Patented Feb. 14, 1922.

Application filed January 2, 1920. Serial No. 348,952.

*To all whom it may concern:*

Be it known that I, FRANK V. ELBERTZ, a citizen of the United States of America, residing at Kokomo, in the county of Howard and State of Indiana, have invented certain new and useful Improvements in Variable-Leverage Gearing, of which the following is a specification, reference being had therein to the accompanying drawings.

The invention relates to gearing more particularly designed for use in differential gearing for vehicle axles and for similar uses, and it is the object of the invention to maintain an operative construction where the traction of the two wheels is unequal. To this end, the invention comprises the novel construction of variable leverage gearing as hereinafter set forth.

In the drawings:

Figure 1 is a longitudinal section through my improved differential of a design for a rear axle;

Figure 2 is a cross section thereof;

Figures 3, 4 and 5 are diagrammatic views showing the variable leverage gears in successive positions of adjustment.

As usually constructed, differential gearings are provided with gear trains of equal ratios between the driving and the driven members. Thus, under normal conditions the power is divided equally between the two driven members, but with provision permitting unequal speeds of rotation. Where traction is lost by one of the driven wheels, or where its tractive resistance is considerably less than that of the other wheel, the device is usually rendered inoperative, the one wheel spinning while the other remains stationary. With my improved construction such a result is avoided by automatically varying the leverage or gear ratios. This variation is such that the power transmitted to the two traction wheels is alternately increased to the one and diminished to the other, this being periodically reversed, and preferably a plurality of times in each revolution of the tractor wheel. Thus if the tractive resistance of one wheel is diminished, there will be periodically a greater amount of the power transmitted to the other wheel. This will usually be sufficient to maintain operativeness of the device until the tractive resistance is again equalized.

My improved construction is applicable to various types of differential gearing as well as to other mechanisms, but I shall specifically describe it as applied to differential gearing for the drive axle of a motor vehicle. As shown, A is the rotary driving member arranged concentric with the axle and deriving its power from any suitable driving mechanism (not shown). B and B' are the two driven axle shafts, each of which is keyed, or otherwise connected, to a head C having a laterally extending flange D with an internal gear face E. The flanges D extend oppositely, but are spaced from each other to provide clearance for an intermediate rotary member F which is coupled with the member A. The member F is centrally bifurcated and is provided in the furcations thereof with bearings G radially equi-distant from the shafts B and B' and receiving journal pins H. Upon these pins are journaled rotary members I having pinions J which are in mesh respectively with the internal gears E of the flanges D. The members I are further provided with intermeshing gears K which are so constructed as to periodically vary the leverage during the rotation thereof. Preferably these gears have teeth and of such depth as to effect a considerable change in leverage ratio between the inner and outer ends of said teeth. Thus, as shown, the ratio is at one extreme two to one and at the other extreme one to two, or a total variation of one to four.

With the construction as thus far described it will be understood that when the member A is rotatively driven, this will communicate rotary movement to the member F and from the latter through the medium of the pins H to the members I, the pinions J of which are in mesh with the internal gears E. Assuming that the variable leverage gearing is in the position shown in Figure 3 the ratio between the two gears will be one to one and therefore equal power will be transmitted from the member A to each of the internal gears E, thereby driving the connected shafts B and B' with equal power. This condition will continue as long as the shafts B and B' are driven at equal speeds; but in case one of the tractor wheels should slip, allowing the same to rotate at a greater speed, this will bring about a change in the gear ratios. Thus, as shown in Figure 4, one of the gear wheels K has a tooth K' bearing with its extreme outer end against the inner end of a tooth K² of the intermeshing gear wheel K, thereby giving a ratio between the gears of two to one. With such an arrangement two-thirds of the power will be transmitted to one of the traction wheels and only one-third of the power to the other traction wheel, so that any differences in their traction will be compensated for. In the same manner a further rotation of the intermeshing gear wheels K will bring them into the position shown in Figure 5, where the tooth K' has passed out of bearing upon the tooth K² and the base of the next succeeding tooth K³ of the first gear is bearing against the outer end of the next succeeding tooth K⁴ of the second gear. Such an adjustment will reverse the gear ratios, changing from the ratio two to one to the ratio one to two, and consequently, the maximum power will be communicated to the opposite traction wheel.

My construction will thus automatically adjust itself to road conditions and without the introduction of any friction element for resisting the turning of the differential gearing. It is also a construction which may be used in place of any ordinary differential gearing and one which avoids complexity and is inexpensive to manufacture.

What I claim as my invention is:

1. The combination with a rotary drive member and a plurality of rotary driven members, of a differential gearing between said members including variable leverage intermeshing gears.

2. The combination with a rotary drive member and a plurality of rotary driven members, of a differential gearing between said members including intermeshing gears having a relatively great variation in leverage in different positions of relative adjustment thereof.

3. The combination with a rotary drive member, of a plurality of rotary driven members, and a differential gearing between said members including intermeshing gears having teeth with a relatively large variation in leverage between the roots and outer ends of said teeth.

4. A differential gearing comprising a pair of axially aligned driven members, a concentrically arranged driving member, pinions journaled on said driving member, internal gear wheels on the driven members in mesh with the respective pinions, and gear wheels rotatively coupled to the respective pinions and intermeshing with each other, said gear wheels having relatively long teeth producing a relatively large variation in leverage.

5. The combination with a rotary driving member and a plurality of rotary driven members, of transmission means intermediate said members including means for varying the leverage ratio therebetween.

In testimony whereof I affix my signature.

FRANK V. ELBERTZ.